United States Patent
Park et al.

(10) Patent No.: US 8,074,709 B2
(45) Date of Patent: Dec. 13, 2011

(54) CENTER MOUNTING TYPE AIR CONDITIONER FOR VEHICLE

(75) Inventors: Minwoo Park, Daejeon-si (KR); Jongsuk Yun, Daejeon-si (KR); Hahkkyu Kim, Daejeon-si (KR); Sungje Lee, Daejeon-si (KR); Seongseok Han, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 1205 days.

(21) Appl. No.: 11/437,126

(22) Filed: May 18, 2006

(65) Prior Publication Data
US 2006/0260783 A1 Nov. 23, 2006

(30) Foreign Application Priority Data
May 20, 2005 (KR) .................. 10-2005-0042606

(51) Int. Cl.
*B60H 1/00* (2006.01)
(52) U.S. Cl. .............. 165/202; 165/41; 165/42; 165/43; 454/139; 454/156; 454/160; 454/161
(58) Field of Classification Search .............. 165/42–44, 165/202–204; 62/186, 239, 244, 408; 454/69, 454/139
See application file for complete search history.

(56) References Cited

U.S. PATENT DOCUMENTS

| | | | | |
|---|---|---|---|---|
| 5,060,720 A | * | 10/1991 | Wollaber et al. | 165/122 |
| 5,957,769 A | * | 9/1999 | Miyata et al. | 454/69 |
| 6,138,749 A | * | 10/2000 | Kawai et al. | 165/204 |
| 6,782,944 B2 | * | 8/2004 | Kim et al. | 165/203 |
| 2002/0025772 A1 | * | 2/2002 | Egami et al. | 454/121 |

FOREIGN PATENT DOCUMENTS

| | | | | |
|---|---|---|---|---|
| DE | 4104034 A | * | 8/1992 | |
| DE | 19629958 A1 | * | 1/1998 | |
| JP | 11235921 A | * | 8/1999 | |
| JP | 2001158217 A | * | 6/2001 | |
| KR | 2001-0100427 | | 11/2001 | |
| KR | 2004-013594 | | 12/2004 | |

* cited by examiner

*Primary Examiner* — John Ford
(74) *Attorney, Agent, or Firm* — Warn Partners, P.C.

(57) ABSTRACT

The present invention relates to a center mounting type air conditioner for a vehicle, which can reduce size and noise of a blower, and enhance installation efficiency and reduce an installation space of the air conditioner installed in the vehicle. At least one bypass passageway is formed in a dead space located between the scroll case and the air conditioning case, whereby some of air sucked from the intake duct is bypassed and sucked toward the second wheel of the dual blower wheel, to which the motor is connected.

12 Claims, 7 Drawing Sheets

Prior Art

Prior Art

Prior Art

CENTER MOUNTING TYPE AIR CONDITIONER FOR VEHICLE

BACKGROUND OF THE INVENTION

1. Field of the Invention

The present invention relates to a center mounting type air conditioner for a vehicle, and more particularly, to a center mounting type air conditioner for a vehicle, which can bypass some of air sucked from an intake duct through at least one dead space located between a scroll case and an air conditioning case and blow it toward a wheel of a dual blower wheel to which a motor is connected, thereby reducing size and noise of a blower, and enhancing installation efficiency and reducing an installation space of the air conditioner mounted in the vehicle since the front side of the air conditioner has a vertical plane.

2. Background Art

To use the indoor space of a vehicle efficiently, a necessity of a compact type and small-sized air conditioner for the vehicle is being increased. According to such necessity, a semi-center type air conditioner including an evaporator unit and a heater unit, which are integrated with each other, has been generally used.

However, recently, development of a center-mounting type air conditioner including a blast unit, an evaporator unit and a heater unit, which are integrated together, is being increased. FIG. 1 shows a prior art center mounting type air conditioner for a vehicle.

In FIG. 1, the center mounting type air conditioner for the vehicle includes: a blower 10; an air conditioning case 40 having an inlet connected to the blower 10 and an outlet, the outlet having a number of air vents 42 each of which is adjustable in an opening; an evaporator 20 and a heater core 30 embedded in the air conditioning case 40; and at least one temperature-adjustable door 44 for adjusting the opening of a cool air passageway P1 and a hot air passageway P2 of the air conditioning case 40.

The center-mounting type air conditioner for the vehicle is generally classified into three kinds according to a structure of the blower 10 for sucking air and blowing the air toward the air conditioning case 40.

First, one of the three kinds of the blowers has a structure to suck air bi-directionally, namely, in right and left directions. As shown in FIG. 2, the blower 10a includes two scroll cases 11a and 11a, two intake ducts 12a and 12a respectively connected to the outer circumference of each scroll case 11a for sucking the indoor air or the outdoor air; a motor 13a mounted between the two scroll cases 11a and 11a; and two blower wheels 14a and 14a respectively connected to shafts protruding outwardly from both sides of the motor 13a, each blower wheel 14a being mounted inside each scroll case 11a.

Thereby, when the opening of each intake duct 12a is adjusted by a door (not shown), the indoor air or the outdoor air is sucked toward both sides of the blower 10a, and then, blown to the inside of the air conditioning case 40 through each scroll case 11a.

The prior art center mounting type air conditioner to which the blower 10a of FIG. 2 is applied has an advantage in that it can supply sufficient air volume and reduce noise, but has a disadvantage in that it is difficult to achieve a compact type or small-size air conditioner for a vehicle since the blower 10a has two air intake structures located at right and left sides thereof.

Furthermore, the prior art center mounting type air conditioner to which the blower 10a of FIG. 2 is applied has another disadvantage in that it cannot provide good installation efficiency and occupies a wide installation space when it is installed in rear of a dash panel of the vehicle since the front side of the air conditioner, namely, the front side of the blower 10a, does not have a vertical plane and the upper portion thereof is projected forwardly.

FIG. 3 shows another blower lob having a structure to suck air bi-directionally, namely, in right and left directions.

The blower 10b includes a scroll case 11b, an intake duct 12b connected to the scroll case 11b for sucking the indoor air or the outdoor air, a dual blower wheel 14b rotatably mounted inside the scroll case 11b, and a motor 13b for rotating the dual blower wheel 14b.

As shown in FIG. 4, the dual blower wheel 14b has two wheels 15b and 16b disposed on both sides of a hub plate 17b to which the motor 13b is connected.

As described in the above, the blower 10b of FIG. 3 has a size smaller than the blower 10a of FIG. 2 since the blower 10b of FIG. 3 has one scroll case 11b, and provides sufficient air volume since it sucks and blows air bi-directionally.

However, the blower 10b of FIG. 3 has a disadvantage in that it generates serious noise due to an interference caused between a flow of air sucked toward the wheel 16b of the motor 13b and a flow of air blown out from the wheels 15b and 16b as shown in FIG. 4.

Meanwhile, the other blower (not shown), which has one blower wheel, may be applied to the air conditioner for the vehicle. The blower having one blower wheel can reduce noise sufficiently, but not provide proper size and air volume.

SUMMARY OF THE INVENTION

Accordingly, to solve the above disadvantages of the prior arts, it is an object of the present invention to provide a center mounting type air conditioner for a vehicle, which can reduce size and noise of a blower sufficiently, and provide good installation efficiency and reduce an installation space of the air conditioner mounted inside the vehicle.

To accomplish the above objects, according to the present invention, there is provided a center mounting type air conditioner for a vehicle, which includes: a blower having a scroll case, which has an inlet and an outlet, an intake duct mounted at the inlet of the scroll case and having an indoor air intake port and an outdoor air intake port, the indoor air intake port and the outdoor air intake port being adjusted in their opening by an intake door, a dual blower wheel rotatably mounted inside the scroll case and having first and second wheels for sucking and blowing air bi-directionally, and a motor for rotating the dual blower wheel; and an air conditioning case having an inlet and outlet, the inlet being connected to the outlet of the scroll case, the outlet having a number of air vents which are respectively adjusted in their opening by doors, an evaporator and a heater core being mounted inside the air conditioning case, comprising: at least one bypass passageway formed in a dead space located between the scroll case and the air conditioning case, whereby some of air sucked from the intake duct is bypassed and sucked toward the second wheel of the dual blower wheel, to which the motor is connected.

The bypass passageway may be formed in the dead space located between a cut-off area where a scroll part and the air vent of the scroll case meet together and the air conditioning case.

The bypass passageway may be formed in the dead space located between the scroll case and the air conditioning case in which the downstream part of the evaporator is positioned.

The motor is mounted at a position opposed to another position where the intake duct is mounted inside the scroll case, a motor housing is mounted inside the scroll case in such a way as to communicate with the intake duct through the bypass passageway, and the motor includes a number of vent holes formed therein for communicating the inside of the motor housing with the inside of the second wheel.

It is preferable that the indoor intake port is mounted in a central axis direction of the scroll case, the outdoor intake port is mounted in a radial direction of the scroll case in such a way as to communicate with the indoor air intake port and the scroll case, and the intake door has in a dome-like structure so as to adjust the opening of the indoor air intake port and the outdoor air intake port.

It is preferable that the front side of the blower has a vertical plane.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings. Words and terms in this specification and claims shall be interpreted into meaning and concept corresponding to technical conception of the present invention based on the principle that an inventor can properly define terms to explain and describe an invention in the best way.

Figure 1:
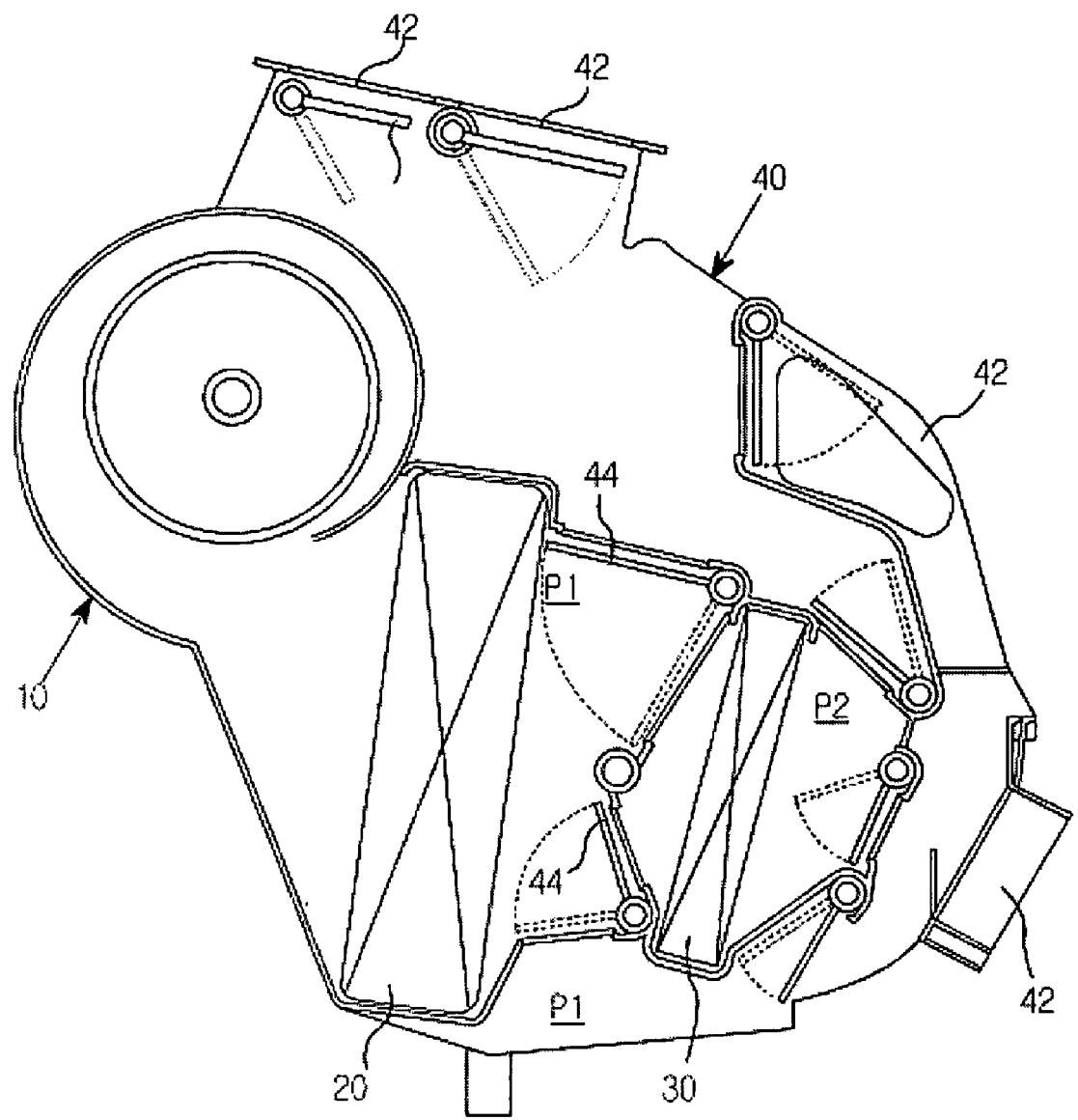
FIG. 1 is a side sectional view of a prior art center mounting type air conditioner for a vehicle.
Figure 2:
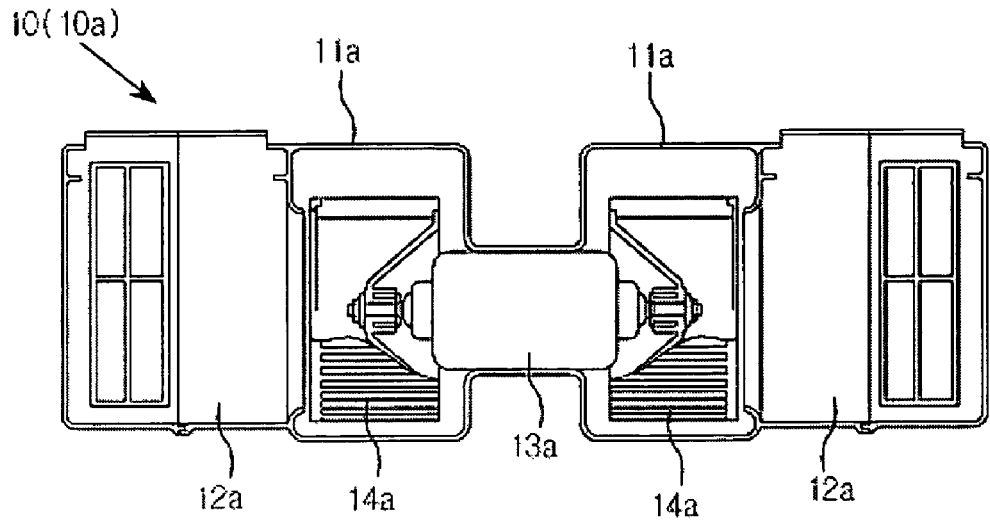
FIG. 2 is a plan sectional view showing an example of a blower applied to the prior art center mounting type air conditioner for the vehicle.
Figure 3:
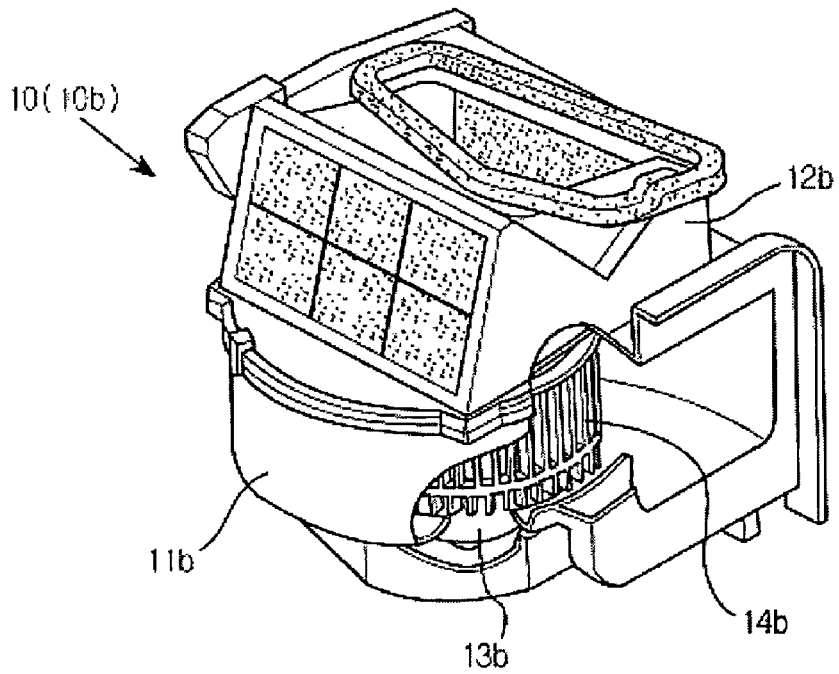
FIG. 3 is a perspective view showing another example of the blower applied to the prior art center mounting type air conditioner for the vehicle.
Figure 4:
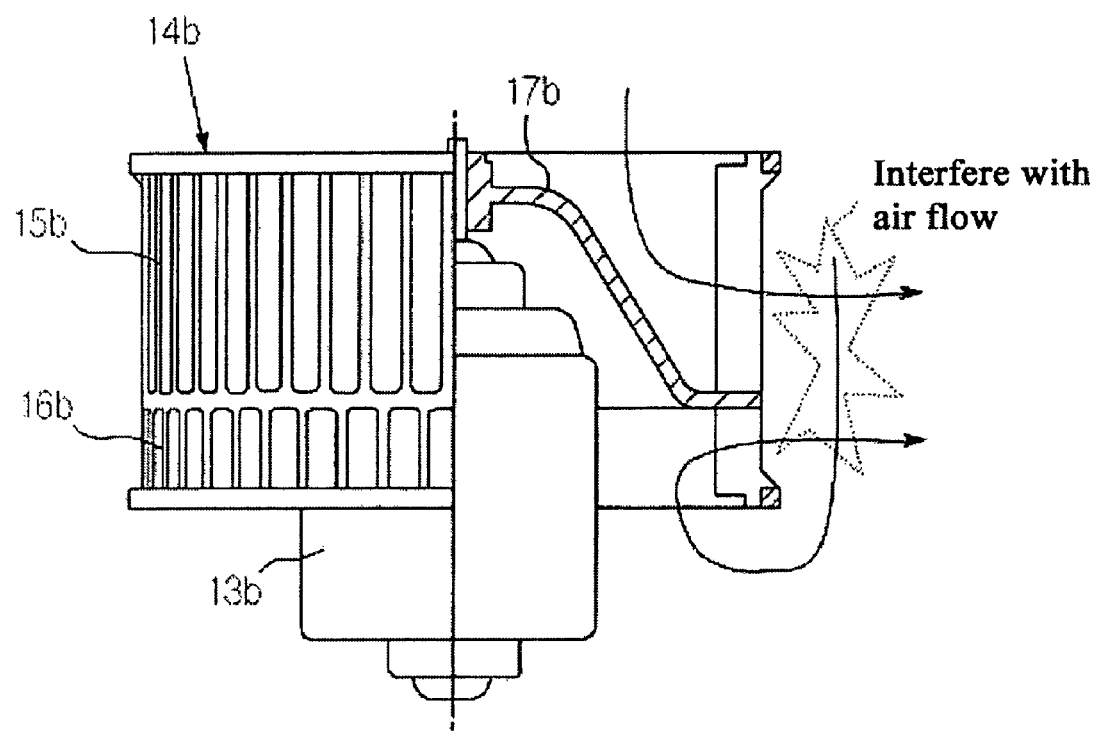
FIG. 4 is a view for explaining a blowing structure of the blower of FIG. 3.
Figure 5:
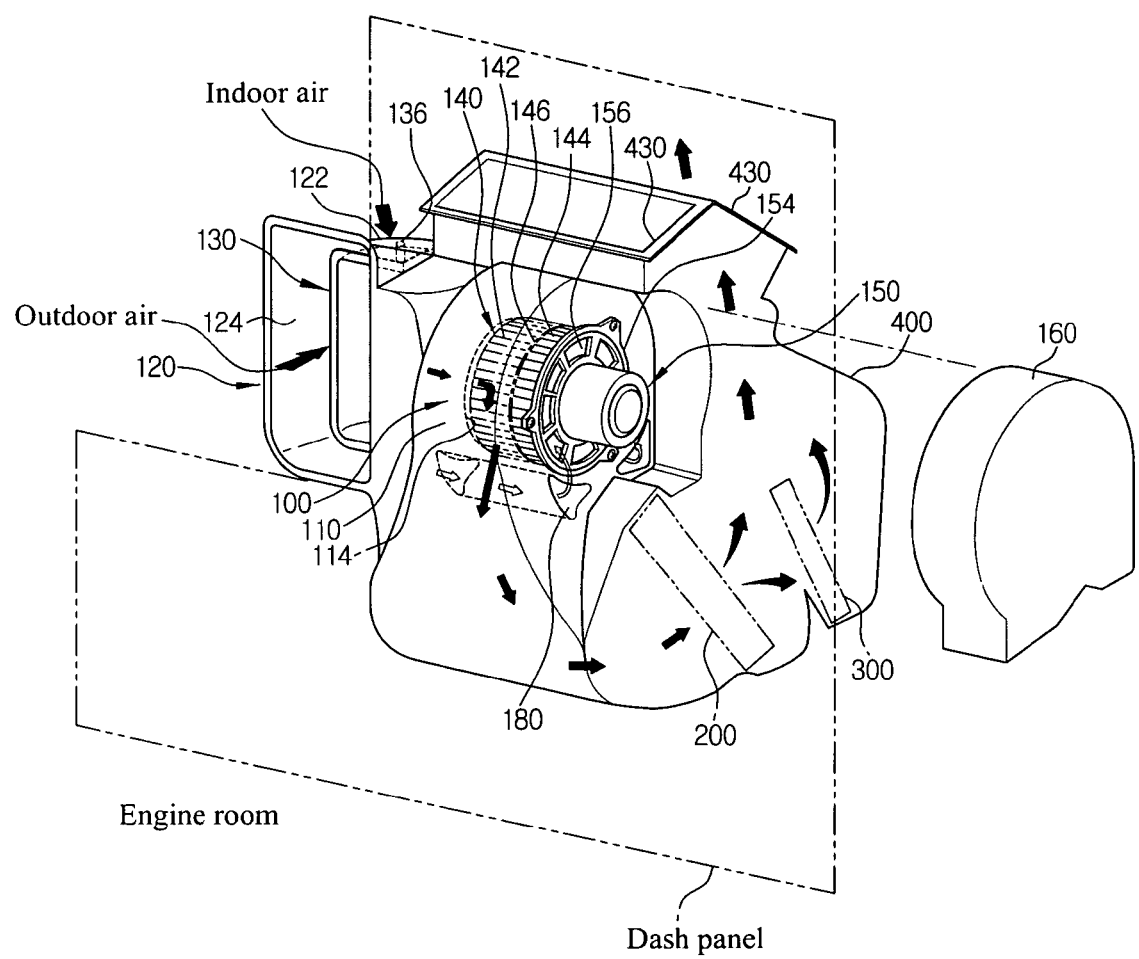
FIG. 5 is a perspective view of a center mounting type air conditioner for a vehicle according to the present invention.
Figure 6:
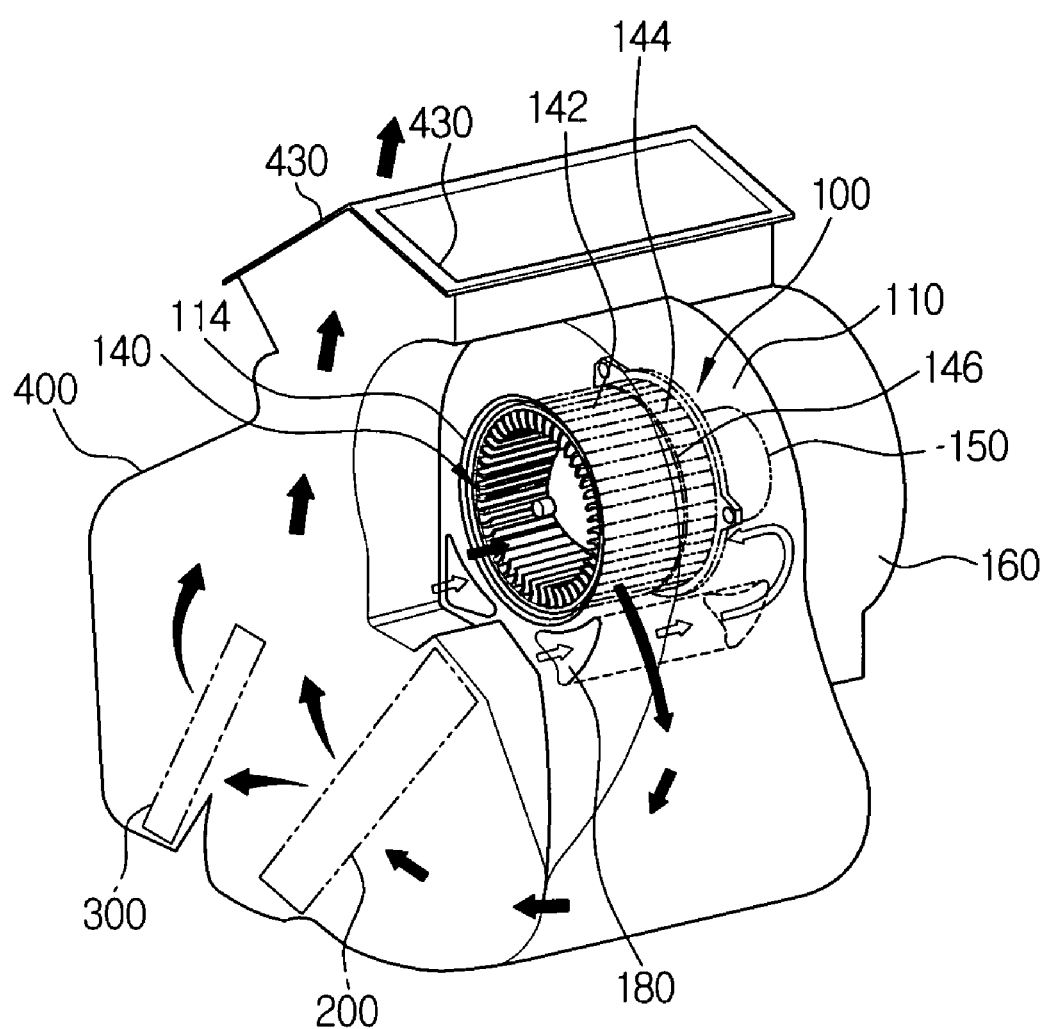
FIG. 6 is a perspective view showing a state where an intake duct is removed from the center mounting type air conditioner of FIG. 3.
Figure 7:
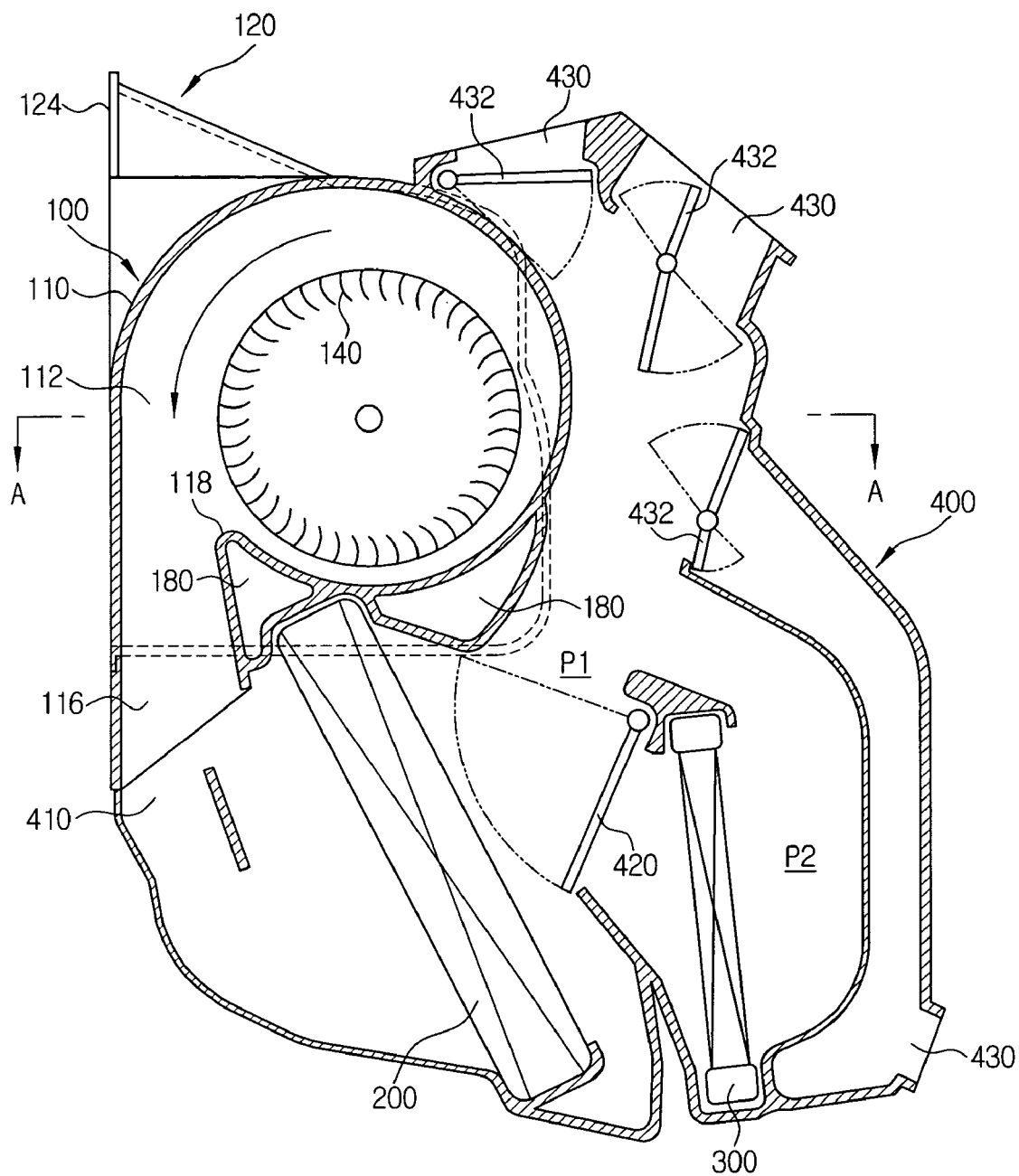
FIG. 7 is a sectional view of the center mounting type air conditioner for the vehicle according to the present invention.
Figure 8:
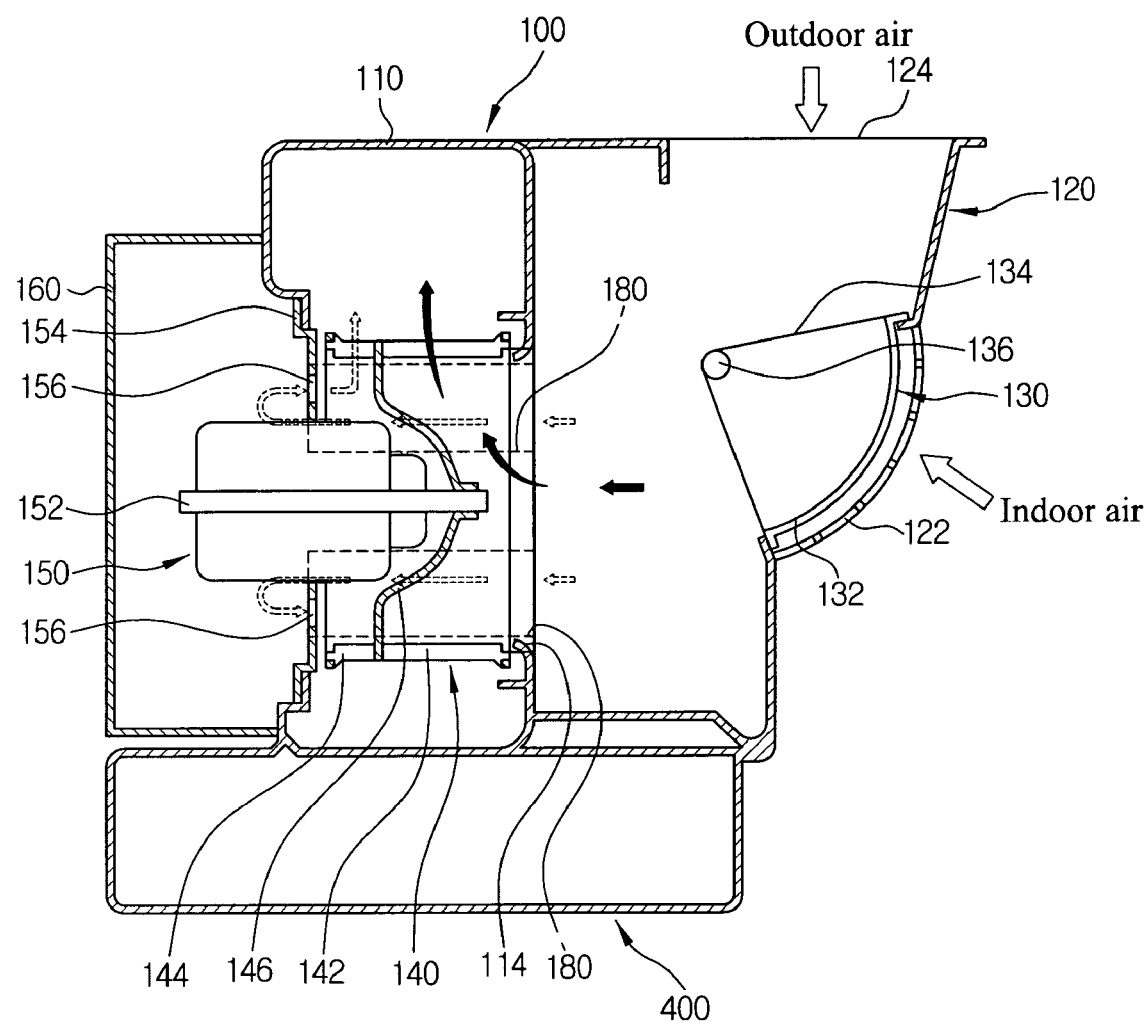
FIG. 8 is a sectional view taken along the line of A-A of FIG. 7.

FIG. 5 is a perspective view of a center mounting type air conditioner for a vehicle according to the present invention, FIG. 6 is a perspective view showing a state where an intake duct is removed from the center mounting type air conditioner of FIG. 3, FIG. 7 is a sectional view of the center mounting type air conditioner for the vehicle according to the present invention, and FIG. 8 is a sectional view taken along the line of A-A of FIG. 7.

As shown in the drawings, the center mounting type air conditioner for the vehicle according to the present invention includes: a blower 100; an air conditioning case 400 connected to the blower 100; and an evaporator 200 and a heater core 300 mounted inside the air conditioning case 400.

The blower 100 includes: a scroll case 110 having an outlet 116 connected to an inlet 410 of the air conditioning case 400; an intake duct 120 mounted at an inlet 114 of the scroll case 110 and having an indoor air intake port 122 and an outdoor air intake port 124 which are respectively adjusted by an intake door 130 in opening; a dual blower wheel 140 rotatably mounted inside the scroll case 110 for sucking air bi-directionally and blowing the air toward the outlet 116 of the scroll case 110; and a motor 150 for rotating the dual blower wheel 140.

It is preferable that the front side of the blower 100 has a vertical plane as shown in FIG. 7.

Moreover, the dual blower wheel 140 includes a hub plate 146 connected to a shaft 152 of the motor 150, and first and second wheels 142 and 144 mounted at both sides of the hub plate 146. The shaft 152 of the motor 150 passes through the second wheel 144, and then joined to the hub plate 146.

Additionally, as shown in FIG. 8, the indoor air intake port 122 is mounted in a central axis direction of the scroll case 110, and the outdoor air intake port 122 is mounted in a radial direction of the scroll case 110 in such a way as to communicate with the indoor air intake port 122 and the scroll case 110.

Furthermore, the intake door 130 for adjusting the opening of the indoor and outdoor air intake ports 122 and 124 has a dome-like structure, and includes a curved plate 132 and arm plates 134 mounted at both ends of the curve plate 132. It is preferable that the intake door 130 adjusts the opening of the indoor and outdoor air intake ports 122 and 124 according to a turning angle of the intake door 130. Meanwhile, the reference numeral 136 designates a hinge part for rotatably connecting the arm plates 134 of the dome-like intake door 130 and the intake duct 120 together.

In addition, inside the scroll case 110, a motor housing 160 for surrounding the motor 150 is mounted at a position opposed to a position where the intake duct 120 is mounted. The inside of the motor housing 160 and the inside of the intake duct 120 are communicated with each other by at least one bypass passageway 180.

The bypass passageway 180 is formed in a dead space located between the scroll case 110 and the air conditioning case 400, so that some of the air sucked from the intake duct 120 is bypassed and sucked toward the second wheel 144 of the dual blower wheel 140, to which the motor 150 is connected.

The bypass passageway 180 may be formed in the dead space located between a cut-off area 118 where a scroll part 112 and the air vent of the scroll case 110 meet together and the air conditioning case 400. Alternatively, the bypass passageway 180 may be formed in a dead space located between the scroll case and the air conditioning case in which the downstream part of the evaporator is positioned.

Moreover, the motor 150 includes a support plate 154 spaced apart from an end of the second wheel 144 at a predetermined distance in such a way that the support plate 154 can be fixed on a side of the scroll case 110, and a number of vent holes 15 formed in the support plate 154 for communicating the inside of the motor housing 160 with the inside of the second wheel 144.

Meanwhile, the bypass passageway 180 may be formed on the circumference of the scroll case 110 in one of various shapes according to a location of the evaporator 200 mounted inside the air conditioning case 400 or the internal structure of the air conditioning case 400.

Therefore, the inside of the intake duct 120 is communicated with the inside of the second wheel 144 through the bypass passageway 180, the motor housing 160, and the vent holes 156, so that some of the air sucked to the inside of the intake duct 120 through the indoor air intake port 122 or the outdoor air intake port 124 can be flowed into the inside of the first wheel 142 through the inlet 114 of the scroll case 110 and the remaining air can be flowed into the inside of the second wheel 144 through the bypass passageway 180, the motor housing 160 and the vent holes 156 of the motor 150.

As described above, the air flowing to the inside of the first wheel 142 and the second wheel 144 of the dual blower wheel 140 is discharged radially by rotation of the dual blower wheel 140, and then, blown to the inside of the air conditioning case 400 through the outlet 116 of the scroll case 110.

In the meantime, in FIG. 7, the reference numeral 420 designates a temperature-adjustable door for adjusting an air volume passing through the cool air passageway P1 and the hot air passageway P2 of the air conditioning case 400. The air conditioning case 400 has a number of air vents 430 mounted at an outlet of the air conditioning case 400, and an opening of each air vent 430 is adjusted by each of doors 432.

Hereinafter, the operation of the center mounting type air conditioner for the vehicle according to the present invention will be described.

The center mounting type air conditioner is installed, for example, in a space formed in rear of a dash panel of the vehicle. The air conditioner can be easily installed in the vehicle and occupy a small installation space since the front side of the blower 100 has the vertical plane like a vertical plane of the dash panel.

After the center mounting type air conditioner is equipped in the vehicle, when it is operated, the air intake mode, the air discharge mode, and the stage of the motor 150 of the blower 100 can be controlled in an automatic mode or a manual mode.

When the motor 150 of the blower 100 is driven by operation of the air conditioner, the dual blower wheel 140 connected to the shaft 152 of the motor 150 is rotated inside the scroll case 110, so that the indoor air or the outdoor air is sucked to the inside of the intake duct 120 through the indoor air intake port 122 or the outdoor air intake port 124 by suction force.

Continuously, some of the air sucked to the inside of the intake duct 120 is flowed into the inside of the first wheel 142 of the dual blower wheel 140 through the inlet 114 of the scroll case 110, and the remaining air is flowed into the inside of the second wheel 144 of the dual blower wheel 140 through the bypass passageway 180, the motor housing 160 and the vent holes 156 of the motor 150.

The air flowed into the inside of the first and second wheels 142 and 144 of the dual blower wheel 140 is discharged in a radial direction of the dual blower wheel 140, and then, blown to the inside of the air conditioning case 400 through the outlet 116 of the scroll case 110.

The air blown to the inside of the air conditioning case 400 is converted into cool air or hot air while passing only through the evaporator 200 or through the evaporator 200 and the heater core 300 according to adjustment of the opening by the temperature-adjustable door 420. The cool air or hot air is discharged to the inside of the vehicle through the air vent 430 opened in the air discharge mode, so that the indoor of the vehicle can be cooled or heated.

According to the present invention, some of the air sucked into the intake duct 120 is bypassed and flowed into the second wheel 144 of the dual blower wheel 140 through the bypass passageway 180 formed in the dead space located between the scroll case 110 and the air conditioning case 400, whereby the flow of the air sucked to the inside of the second wheel 144 may not be influenced by the flow of the air radially discharged from the first and second wheels 142 and 144 of the dual blower wheel 140.

As described above, the center mounting type air conditioner for the vehicle according to the present invention has the structure that some of the air sucked into the intake duct 120 is bypassed and flowed toward the second wheel 144 of the dual blower wheel 140, so that the flow of the air sucked to the inside of the second wheel 144 may not be influenced by the flow of the air radially discharged from the first and second wheels 142 and 144 of the dual blower wheel 140, thereby increasing air volume and remarkably reducing noise more than the prior arts.

Moreover, the center mounting type air conditioner for the vehicle has the structure that the bypass passageway 180 is formed in the dead space located between the scroll case 110 and the air conditioning case 400 and the front side of the blower 100 is formed in the vertical plane, thereby reducing the size of the air conditioner, enhancing installation efficiency and reducing the installation space of the air conditioner equipped in the vehicle.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A center mounting type air conditioner for a vehicle comprising:
    a vehicle having an upper part and lower part;
    a blower having a scroll case, which has an inlet and an outlet, an intake duct mounted at the inlet of the scroll case and having an indoor air intake port and an outdoor air intake port, the indoor air intake port and the outdoor air intake port being adjusted in their opening by an intake door, a dual blower wheel rotatably mounted inside the scroll case and having first and second wheels for sucking and blowing air bi-directionally, and a motor for rotating the dual blower wheel;
    an air conditioning case having an upper part parallel to said upper part of said vehicle, an inlet and outlet, the inlet being connected to the outlet of the scroll case, the outlet having a number of air vents which are respectively adjusted in their opening by doors, an evaporator and a heater core being mounted inside the air conditioning case; and
    a bypass passageway enclosed within a gap between a cut-off area where a scroll part and the outlet of the scroll case meet together and the air conditioning case in which the upper part of the evaporator is positioned, wherein said bypass passageway is configured to receive and bypass said first wheel some of the air from said intake duct located upstream of said inlet of said air conditioner case and wherein said bypassed air is then sucked toward the second wheel of the dual blower wheel, to which the motor is connected; and
    wherein the scroll case is arranged on and is connected to the upper part of the air conditioning case.

2. A center mounting type air conditioner for a vehicle according to claim 1, wherein the motor is mounted at a position opposed to another position where the intake duct is mounted at said inlet of the scroll case, a motor housing is mounted inside the scroll case in such a way as to communicate with the intake duct through the bypass passageway, and the motor includes a support plate having a number of vent holes formed therein for communicating the inside of the motor housing with the inside of the second wheel.

3. A center mounting type air conditioner for a vehicle according to claim 1, wherein the indoor air intake port is mounted on a central axis direction of the scroll case, the outdoor air intake port is mounted in a radial direction of the scroll case in such a way as to communicate with the indoor air intake port and the scroll case, and the intake door has a dome-like structure so as to adjust the opening of the indoor air intake port and the outdoor air intake port.

4. A center mounting type air conditioner for a vehicle according to claim 1, wherein the front side of the blower has a vertical plane parallel to a vertical plane of a dash panel of the vehicle.

5. A center mounting type air conditioner for a vehicle comprising:
a vehicle having an upper part and lower part;
a blower having a scroll case, which has an inlet and an outlet, an intake duct mounted at the inlet of the scroll case and having an indoor air intake port and an outdoor air intake port, the indoor air intake port and the outdoor air intake port being adjusted in their opening by an intake door, a dual blower wheel rotatably mounted inside the scroll case and having first and second wheels for sucking and blowing air bi-directionally, and a motor for rotating the dual blower wheel;
an air conditioning case having an upper part parallel to said upper part of said vehicle, an inlet and outlet, the inlet being connected to the outlet of the scroll case, the outlet having a number of air vents which are respectively adjusted in their opening by doors, an evaporator and a heater core being mounted inside the air conditioning case; and
a bypass passageway enclosed within a gap between a cut-off area where a scroll part and the outlet of the scroll case meet together and the air conditioning case, wherein said bypass passageway is configured to receive and bypass said first wheel some of the air from said intake duct located upstream of said inlet of said air conditioner case and wherein said bypassed air is then sucked toward the second wheel of the dual blower wheel, to which the motor is connected; and
wherein the scroll case is arranged on and is connected to the upper part of the air conditioning case.

6. A center mounting type air conditioner for a vehicle according to claim 5, wherein the motor is mounted at a position opposed to another position where the intake duct is mounted at said inlet of the scroll case, a motor housing is mounted inside the scroll case in such a way as to communicate with the intake duct through the bypass passageway, and the motor includes a support plate having a number of vent holes formed therein for communicating the inside of the motor housing with the inside of the second wheel.

7. A center mounting type air conditioner for a vehicle according to claim 5, wherein the indoor air intake port is mounted on a central axis direction of the scroll case, the outdoor air intake port is mounted in a radial direction of the scroll case in such a way as to communicate with the indoor air intake port and the scroll case, and the intake door has a dome-like structure so as to adjust the opening of the indoor air intake port and the outdoor air intake port.

8. A center mounting type air conditioner for a vehicle according to claim 5, wherein a front side of the blower has a vertical plane parallel to a vertical plane of a dash panel of the vehicle.

9. A center mounting type air conditioner for a vehicle comprising:
a vehicle having an upper part and lower part;
a blower having a scroll case, which has an inlet and an outlet, an intake duct mounted at the inlet of the scroll case and having an indoor air intake port and an outdoor air intake port, the indoor air intake port and the outdoor air intake port being adjusted in their opening by an intake door, a dual blower wheel rotatably mounted inside the scroll case and having first and second wheels for sucking and blowing air bi-directionally, and a motor for rotating the dual blower wheel;
an air conditioning case having an upper part parallel to said upper part of said vehicle, an inlet and outlet, the inlet being connected to the outlet of the scroll case, the outlet having a number of air vents which are respectively adjusted in their opening by doors, an evaporator and a heater core being mounted inside the air conditioning case; and
a bypass passageway enclosed within a gap between the scroll case and the air conditioning case in which the upper part of the evaporator is positioned, wherein said bypass passageway is configured to receive and bypass said first wheel some of the air from said intake duct located upstream of said inlet of said air conditioner case and wherein said bypassed air is then sucked toward the second wheel of the dual blower wheel, to which the motor is connected; and
wherein the scroll case is arranged on and is connected to the upper part of the air conditioning case.

10. A center mounting type air conditioner for a vehicle according to claim 9, wherein the motor is mounted at a position opposed to another position where the intake duct is mounted at said inlet of the scroll case, a motor housing is mounted inside the scroll case in such a way as to communicate with the intake duct through the bypass passageway, and the motor includes a support plate having a number of vent holes formed therein for communicating the inside of the motor housing with the inside of the second wheel.

11. A center mounting type air conditioner for a vehicle according to claim 9, wherein the indoor air intake port is mounted on a central axis direction of the scroll case, the outdoor air intake port is mounted in a radial direction of the scroll case in such a way as to communicate with the indoor air intake port and the scroll case, and the intake door has a dome-like structure so as to adjust the opening of the indoor air intake port and the outdoor air intake port.

12. A center mounting type air conditioner for a vehicle according to claim 9, wherein a front side of the blower has a vertical plane parallel to a vertical plane of a dash panel of the vehicle.

* * * * *